United States Patent [19]

Wollar

[11] Patent Number: 5,039,267
[45] Date of Patent: * Aug. 13, 1991

[54] TEE TREE FASTENER

[75] Inventor: Burnell J. Wollar, Barrington, Ill.

[73] Assignee: Phillips Plastics Corporation, Phillips, Wis.

[*] Notice: The portion of the term of this patent subsequent to Jul. 3, 2007 has been disclaimed.

[21] Appl. No.: 485,137

[22] Filed: Feb. 26, 1990

Related U.S. Application Data

[63] Continuation of Ser. No. 358,898, May 30, 1989, Pat. No. 4,938,645.

[51] Int. Cl.⁵ .................................................. F16B 13/02
[52] U.S. Cl. ..................................... 411/508; 411/510
[58] Field of Search ............... 411/508, 510, 509, 904, 411/908, 909, 907, 913, 452, 453, 339, 411, 417, 420, 392, 396, 447; 24/614, 453, 297, 625

[56] References Cited

U.S. PATENT DOCUMENTS

| | | | |
|---|---|---|---|
| 3,136,350 | 6/1964 | Rapata | 411/913 X |
| 3,476,008 | 11/1969 | Pearson et al. | 411/508 |
| 4,396,329 | 8/1983 | Wollar | 411/508 |
| 4,402,641 | 9/1983 | Arff | 411/908 X |
| 4,652,192 | 3/1987 | Schaller | 411/508 X |
| 4,704,059 | 11/1987 | Nakama et al. | 411/913 X |
| 4,728,238 | 3/1988 | Chisholm et al. | 411/510 |
| 4,938,645 | 7/1990 | Wollar | 411/508 |

FOREIGN PATENT DOCUMENTS

| | | | |
|---|---|---|---|
| 2508990 | 1/1983 | France | 411/447 |
| 2020733 | 11/1979 | United Kingdom | 411/508 |

*Primary Examiner*—Rodney M. Lindsey
*Attorney, Agent, or Firm*—Merchant, Gould, Smith, Edell, Welter & Schmidt

[57] ABSTRACT

A two-way fastener which is adapted for joining at least two members in, electively, either a reusable position or a non-reusable position includes an elongate shank, a head member which is integral with an upper portion of the shank, an elongate rail member integral with and substantially parallel to the shank, the rail member having a substantially tee-shaped cross section, a plurality of non-reusable resilient teeth attached to a side of the shank which is opposite the rail member and a plurality of reusable teeth attached to second and third sides of the shank. The non-reusable teeth are angled toward the head member at a first angle, and the reusable teeth are angled toward the head member at a second angle which is less than the first angle. When inserted into a slotted member so that the two sets of reusable teeth engage the sides of the slot, the device acts as a reusable fastener. When inserted so that the elongate rail member and non-reusable teeth contact edges of the slot, the device acts as a non-reusable fastener. An additional function of the rail member is than it constrains the fastener against rotation with respect to a slot in which it is inserted.

4 Claims, 3 Drawing Sheets

TEE TREE FASTENER

This is a continuation of application Ser. No. 07/358,898, filed May 30, 1989, now U.S. Pat. No. 4,938,645.

BACKGROUND OF THE INVENTION

1. Field of the Invention

This invention relates generally to a fastener of the type which may be used to secure a number of apertured or slotted members together More specifically, the invention relates to a fastener for securing an apertured member to a slotted member which, electively, may be inserted in either a permanent or reusable position, and which will retain its rotational position with respect to the members regardless of any external shocks or vibration that are imparted thereto.

2. Description of the Prior Art

A wide range of fasteners exist for securing members of different thicknesses to one another. One class of known fasteners include an elongate shank and a number of axially spaced apart wing elements along the shank which engage the members when inserted into apertures in the panels. Such fasteners are used widely throughout the automobile fabrication industry and elsewhere to join body panels and the like to other elements in an inexpensive, economical manner.

Recently, in an effort to reduce the required tolerances necessary for the process of fabricating component members and securing the members together, it has become common to use slots for the apertures in one or both of the members. By using slots rather than circular-type apertures, the tolerances to which the members and the overall assembly needs to be manufactured to can be reduced. However, the slots present problems for conventional fasteners, which, largely speaking, were designed for use with circular apertures.

FIGS. 1-3 are a bottom plan view of a prior art connector of the type which is described in U.S. Pat. No. 4,396,329, which issued Aug. 2, 1983 to the present inventor. The fastener 10 is shown in use with a slot 16 which is defined by a first slot edge 12 and a second slot edge 14 in a panel member or the like. Fastener 10 includes a plurality of fins 18 which are arranged in four separate rows that are spaced about its periphery. In FIG. 1, fastener 10 is shown in a first rotational position with respect to slot 16, wherein engagement areas 20 on each of the fins 18 contact the respective edges 12, 14 in order to retain fastener 10 within slot 16. The fastener 10 is usually initially inserted in this position.

As vibrations or shocks are imparted to fastener 10 and the members which are joined therewith, the fastener 10 is likely to rotate to the position illustrated by FIG. 2. In FIG. 2, fastener 10 is secured within slot 16 by only two of the fins 18, through engagement areas 22. Eventually, the fastener 10 may rotate to a position illustrated in FIG. 3, wherein none of the fins 18 are engaged with the slot 16 and the fastener 10. At this point, fastener 10 is no longer secured to the member in which slot 16 is defined, and the connection has failed.

Referring now to FIG. 4, a second type of prior art fastener 24 includes a plurality of circular fins 25, each of which extend around the periphery of the shank of the fastener 24. When positioned in a slot defined by edges 12, 14, fastener 24 is held in place by portions 26 of fins 25. This type of fastener requires no particular initial orientation with respect to slot 16, but is manufactured only as a sloped tooth fastener that is non-reusable.

Depicted in FIGS. 5 and 6 is a third type of fastener 28 which includes a pair of semi-circular fins 30 that, when properly oriented with respect to a slot 16, engage the walls of slot 16 at engagement areas 32. However, when fastener 28 is rotated by vibration or shock to the position depicted in FIG. 6, the presence of recess 32 between the fins 30 results in a smaller engagement area 34 to be in contact with the walls 12, 14 which define the slot.

It becomes evident from the foregoing discussion of previously known connectors that there has existed a long and unfilled need in the prior art for a fastener design for use in slotted panels that provides more positive engagement, a larger area of engagement and that will not rotate once assembled.

SUMMARY OF THE INVENTION

Accordingly, it is an object of the invention to provide a fastener for use in slots that provides more positive engagement, a larger area of engagement than was provided in prior art fasteners.

It is further an object of the invention to provide a fastener for use in slots that will resist rotation once it has been inserted into a slot.

It is yet further an object of the invention to provide a fastener which is adapted for joining at least two members together in, electively, either a reusable position or a non-reusable position.

In order to achieve these and other objects of the invention, a fastener which is constructed according to a first aspect of the invention includes a shank which is adapted for axial insertion into an orifice which is defined in a first member and into a slot which is defined in a second member; a head which is integral with the shank and is adapted for engaging an upper surface of the first member; a first engagement structure on at least a first side of the shank, which is adapted for resiliently engaging a lower surface of the second member when the shank is in a first rotational position relative to the slot, and second engagement structure on a second side of the shank which is adapted for resiliently engaging the lower surface of the second member when the shank is in a second rotational position relative to the slot, whereby the fastener may join the members together in either the first or second rotational positions.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is. illustrated and described a preferred embodiment of the invention.

DETAILED DESCRIPTION OF THE PREFERRED EMBODIMENT(S)

Figure 1:
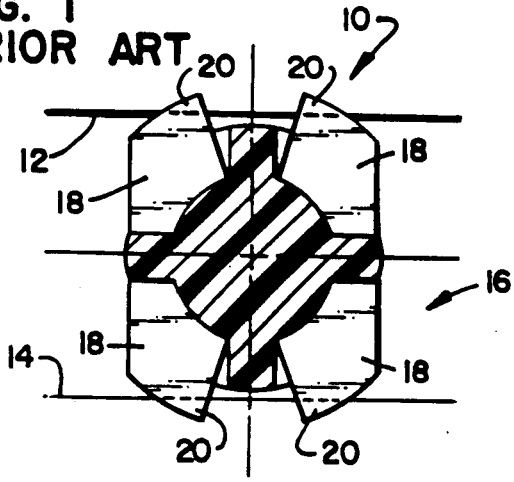
FIG. 1 is a bottom cross-sectional plan view depicting a first prior art fastener in a first rotational position.
Figure 2:
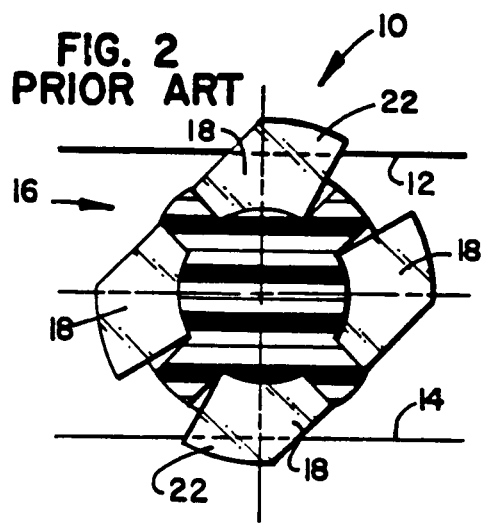
FIG. 2 is a bottom cross-sectional plan view of the fastener in FIG. 1, shown in a second rotational position.
Figure 3:
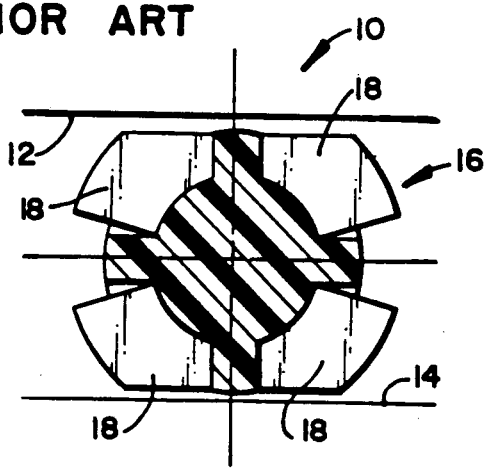
FIG. 3 is a bottom cross-sectional plan view of the fastener illustrated in FIGS. 1 and 2, shown in a third rotational position.
Figure 4:
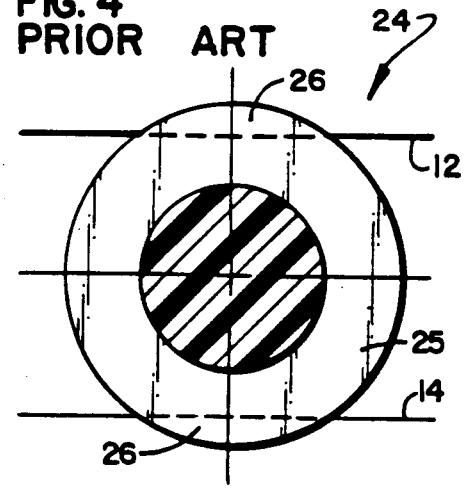
FIG. 4 is a bottom cross-sectional plan view of a second prior art fastener.
Figure 5:
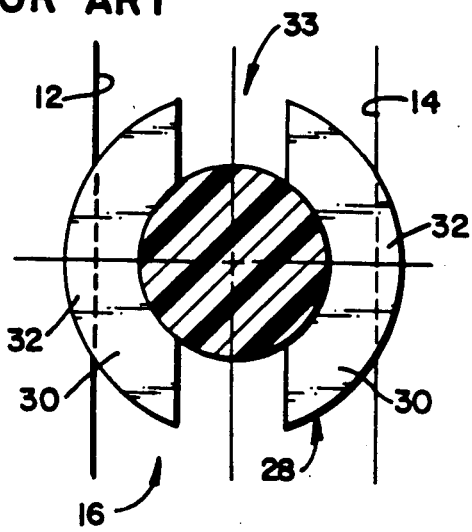
FIG. 5 is a bottom cross-sectional plan view of a third type of prior art fastener shown in a first rotational position.
Figure 6:
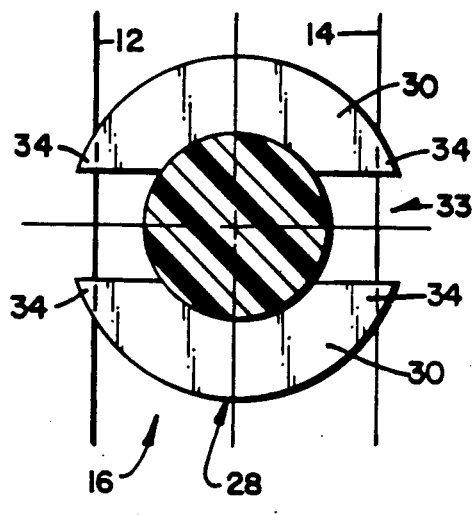
FIG. 6 is a bottom cross-sectional plan view of the prior art fastener illustrated in FIG. 5, shown in a second rotational position.
Figure 7:
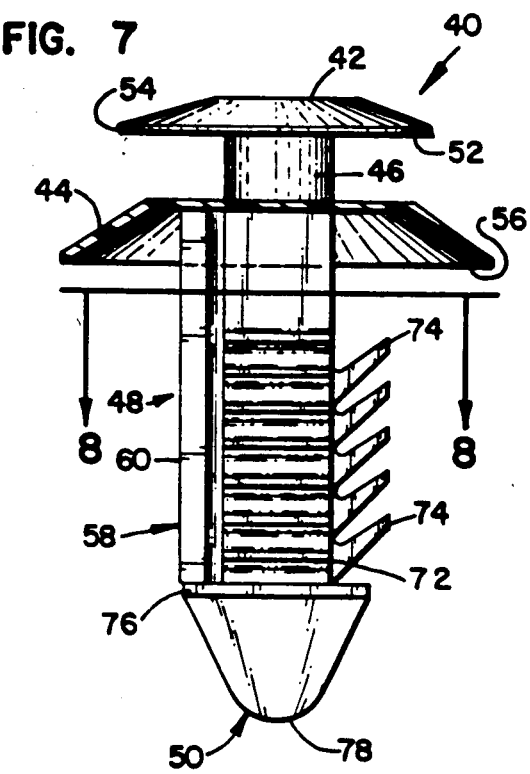
FIG. 7 is an elevational view of a fastener constructed according to a preferred embodiment of the invention, with a portion shown in cross section for clarity.
Figure 8:
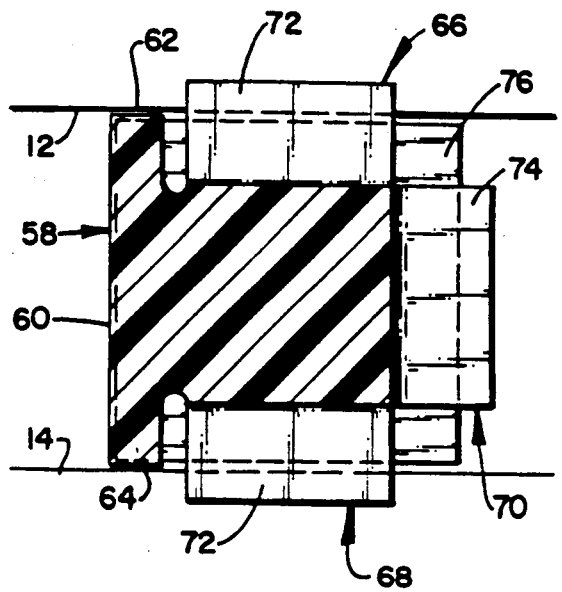
FIG. 8 is a cross-sectional view taken along lines 8—8 in FIG. 7.

Referring now to the drawings, wherein like structure designates corresponding structure throughout the views, and referring in particular to FIG. 7, a tee tree fastener 40 constructed according to a preferred embodiment of the invention includes an upper head portion 42 which preferably is disk-shaped, with an outer peripheral edge 54. Upper head portion 42 is shaped so that a member may be slid into position or buttoned thereover, in a manner which will be described in greater detail below. Upper head portion 42 is connected to an upper surface of a head 44 by an axial spacer 46, as shown in FIG. 7. Head 44 preferably has an inverted dish shape and includes a bottom rim 56, which is adapted to bear against an upper surface of a member, through which the fastener may be inserted. Aligned with the upper head portion 42, head 44 and axial spacer 46 is an elongate shank 48, which terminates in a tip 50. Shank 48 is generally rectangular in cross-section and includes a rail member 58 which extends parallel to the remainder of shank 48, from to bottom of head 44 to tip 50. Referring briefly to FIG. 8, it will be seen that rail 58 is integral with shank 48 and is T-shaped in cross section. The peripheral or outside surface of rail 58 includes a relatively broad side edge 60, a top edge 62 and a lower edge 64.

Referring again to FIG. 8, a non-reusable tooth array 70 is formed on a first side of shank 48, which is opposite the side of shank 48 on which rail 58 is attached. A first reusable tooth array 66 is provided on a second side of shank 48 which is substantially perpendicular to the first side. On a third side of shank 48 which is opposite the above-mentioned second side, a second reusable tooth array 68 is provided.

Figure 10:
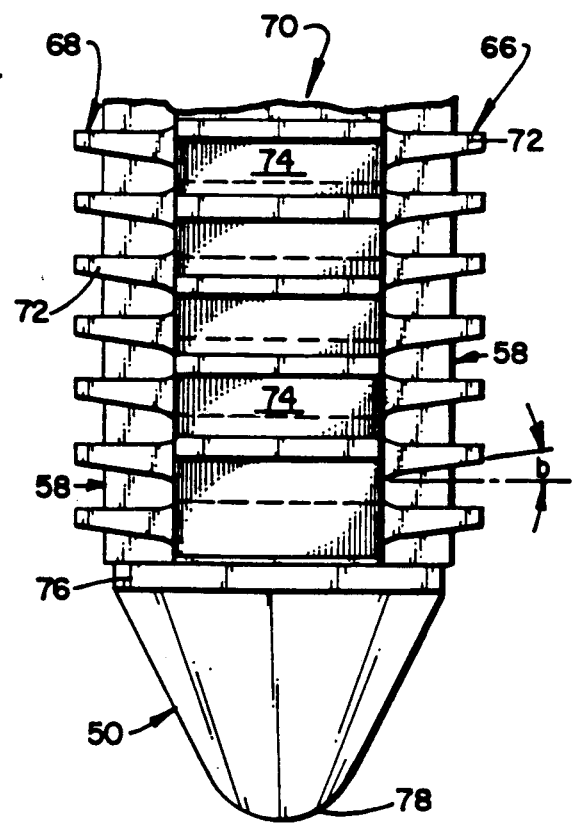
FIG. 10 is an enlarged fragmentary elevational view of a second lower side of the fastener depicted in FIG. 7.

Looking now to FIG. 10, the first reusable tooth array 66 and the second reusable tooth array 68 both are embodied as a row of reusable teeth 72 which extend outwardly from the respective sides of shank 48 and are angled upwardly toward head 44 at an angle (b), which is measured with respect to a line that is perpendicular to the axis of shank 48.

Figure 9:
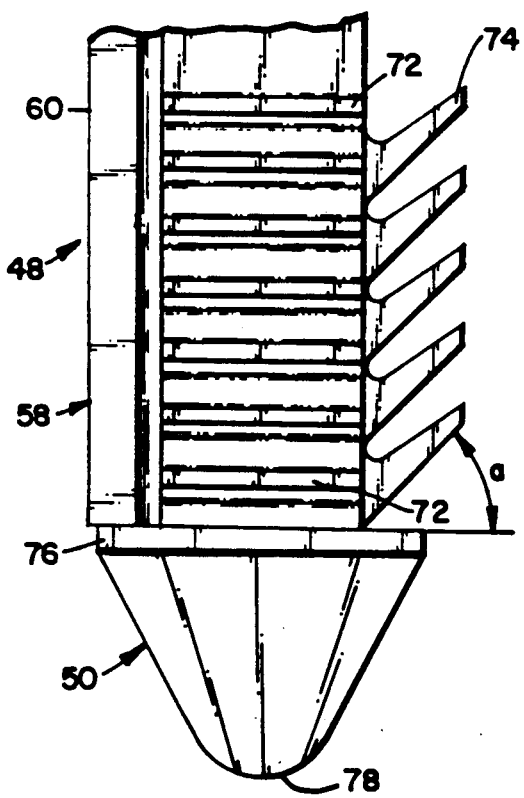
FIG. 9 is an enlarged fragmentary elevational view of a lower portion of the fastener depicted in FIG. 7.

Referring now to FIG. 9, the non-reusable tooth array 70 preferably is formed by a row of high strength steeply angled fins 74 which extend outwardly from the first side of shank 48 and are angled upwardly toward head 44 at an angle (a) which is also measured with respect to a line that is perpendicular to the axis of shank 48. As may be seen by comparing FIGS. 9 and 10, angle (a) is substantially greater than angle (b). Teeth 74 further are preferably formed to be substantially stronger and more rigid than the reusable teeth 72, for reasons which will be discussed in greater detail below.

Referring again to FIG. 7, tip 50 preferably includes a rectangular head portion 76, the profile of which may be seen with greater detail in FIG. 8. Tip 50 is smoothly tapered from rectangular head 76 to a rounded tip end 78 to ease insertion of the fastener 40 into aperture or slot.

Figure 11:
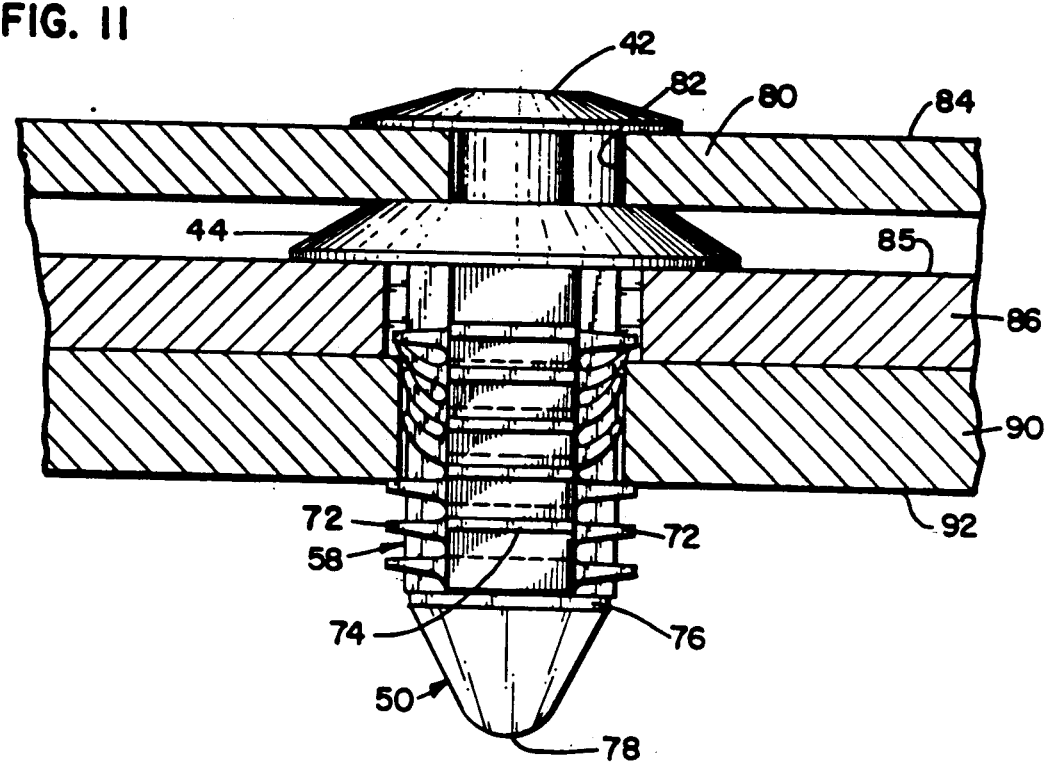
FIG. 11 is a cross-sectional view depicting the fastener of FIG. 7, in a first operative position.
Figure 12:
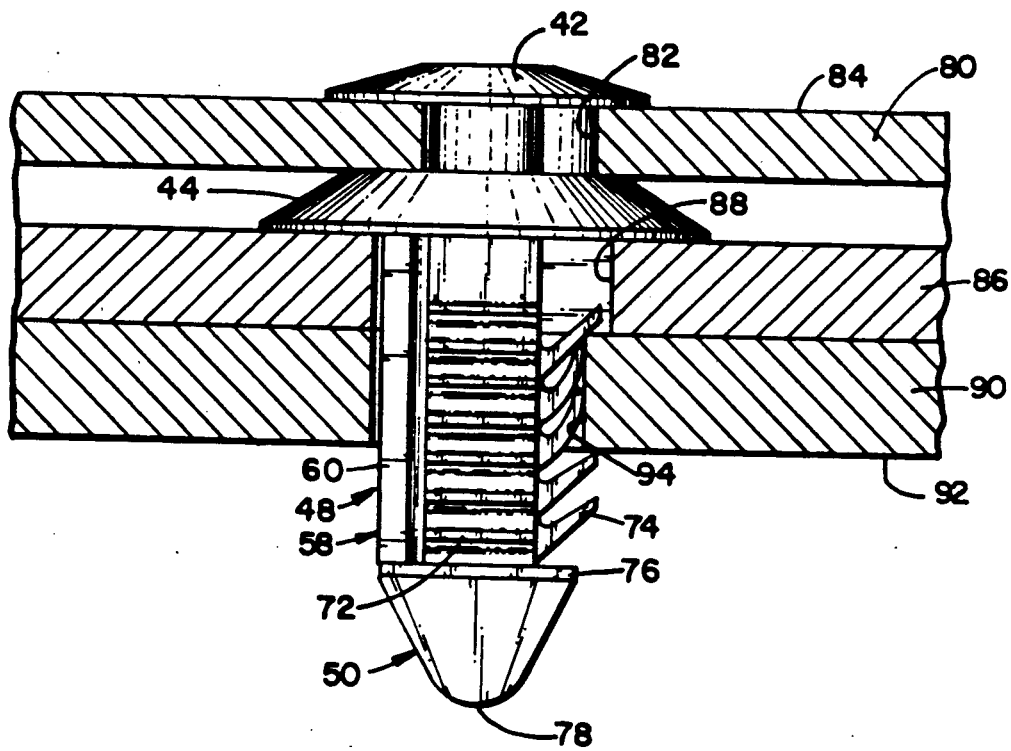
FIG. 12 is a cross-sectional view depicting operation of the fastener illustrated in FIG. 7, in a second operative position.

Turning to FIGS. 11 and 12, the various modes of operation for a tee tree fastener 40 constructed according to the invention will now be discussed. It should be noted and understood that the following discussion is provided as an example only of the many applications to which a fastener according to the invention may be put, and is not intended to be limiting. Looking first to FIG. 11, second member 86 may be secured to third member 90 by inserting the shank 48 of fastener 40 through an aperture which is provided in second member 86 and through a slot 16 in third member 90. The fastener 40 is pushed against the second and third members 86, 90 until they are urged together, with the bottom rim 56 of head 44 contacting an upper surface 85 of second member 86, and with one of the reusable teeth 72 on each of the first and second tooth arrays 66, 68 contacting a lower surface 92 of third member 90 in resilient fashion. Due to the relative angle at which teeth 72 are positioned, and the flexibility of teeth 72, the fastener 40 may be withdrawn from the slot in third member 90 by pulling it in a direction opposite the insertion direction, without damaging teeth 72. Thus, FIG. 11 depicts fastener 40 in its reusable position. The extreme upper member 80 may be secured to fastener 40 by positioning member 80 so that a slot defined by surface 82 receives the upper head portion 42. This may be done by sliding the first member 80 into position relative to upper head portion 42, or by tilting the first member 80 and pushing upper head portion 42 through the entrance of the slot which is defined therein.

Referring now to FIG. 12, the fastener 40 may be inserted into the aperture in second member 86 and the slot in third member 90 in a second, non-reusable orientation. In this position, the side edge 60 of rail member 58 will bear against one side of the slot, and the high strength steep-angled fins 74 will be positioned on the opposite side of the slot. Fastener 40 is inserted in a manner similar to that described above with reference to FIG. 11, except that the fastener is rotated ¼ of a turn to properly orient the rail member 58 and non-reusable tooth array 70 with respect to the slot. The bottom rim 56 of head 44 will contact the upper surface 85 of second member 86, and one of the high strength steep-angled non-reusable fins 74 will resiliently engage the lower surface 92 of third member 90. Because the non-reusable high strength steep-angled fins 74 are angled more steeply yet are more rigid than the reusable teeth 72, they have an insertion force which is roughly the same as the aggregate insertion force of the two arrays 66, 68 of reusable teeth. However, the extraction value of the fastener inserted in the manner of FIG. 12 is greater than the extraction value of the fastener when used in the position shown in FIG. 11. Depending on the application and what the end user requires, either set of teeth can be used, which presents many alternatives to those designs that are presently on the market.

A second advantage of a fastener constructed according to the invention is that it is prevented from rotating relative to the slot which is defined in third member 90 during operation. When fastener 40 is inserted in a position illustrated in FIG. 11, the edges 12, 14 which define the slot are abutted by the top edge 62 and lower edge 64 of rail member 58, as is clearly illustrated in FIG. 8. When fastener 40 is inserted in the manner depicted in FIG. 12, its orientation relative to the slot is maintained because side edge of rail member 58 remains firmly abutted against one edge of the slot.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed. For example, the present reusable teeth could be made non-reusable, and the present non-reusable teeth could be reusable.

What is claimed is:

1. A two-way fastener which is adapted for joining at least two members together in, electively, either a first fastening position or a second fastening position, comprising:

an elongate shank;

a head member which is integral with an upper portion of said shank;

means integral with said shank which is adapted for abutting the walls of a slot defined in one of the members, thereby preventing rotation of said fastener relative to the slot once it has been inserted into the slot;

a plurality of first resilient teeth attached to a side of said shank which is opposite said abutting means, said teeth being angled toward said head member at a first angle; and a plurality of second teeth attached to second and third sides of said shank which are substantially perpendicular to said first side, said second teeth being angled toward said head member at a second angle, whereby said fastener is adapted to be inserted into a slot, electively, in either a first fastening orientation or a second fastening orientation, with said abutting means adapted to abut sides of the slot to prevent rotation of said fastener.

2. A fastener according to claim 1, wherein said second angle is less than said first angle.

3. A fastener according to claim 1, wherein said first teeth are non-reusable.

4. A fastener according to claim 1, wherein said second teeth are reusable.

* * * * *